Feb. 21, 1956  J. R. WAIT  2,735,980
METHOD OF GEOPHYSICAL EXPLORATION
Filed Dec. 23, 1953  2 Sheets-Sheet 2
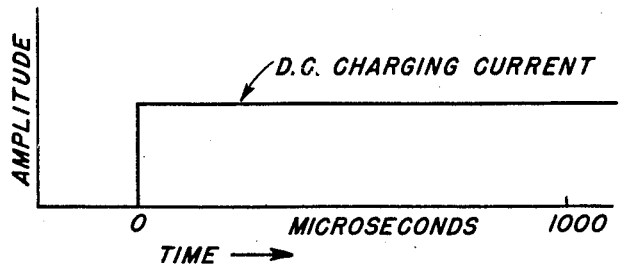
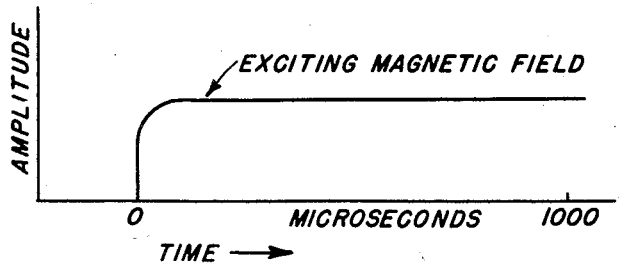
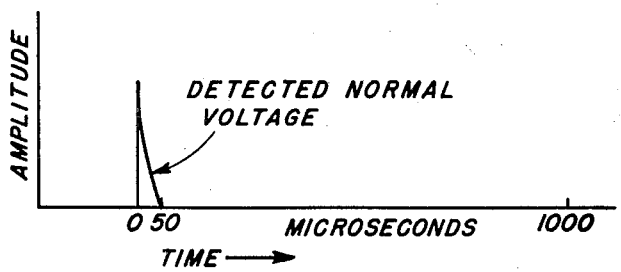
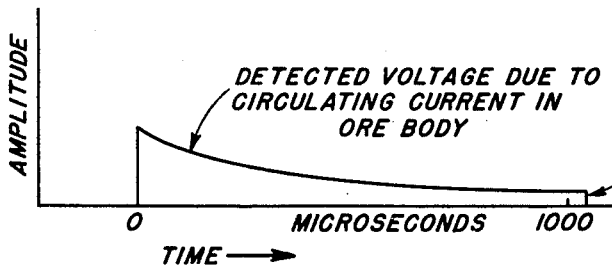
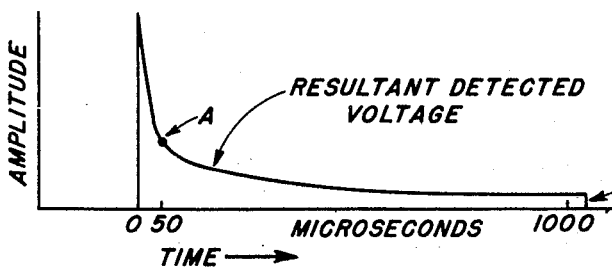
JAMES R. WAIT
INVENTOR.

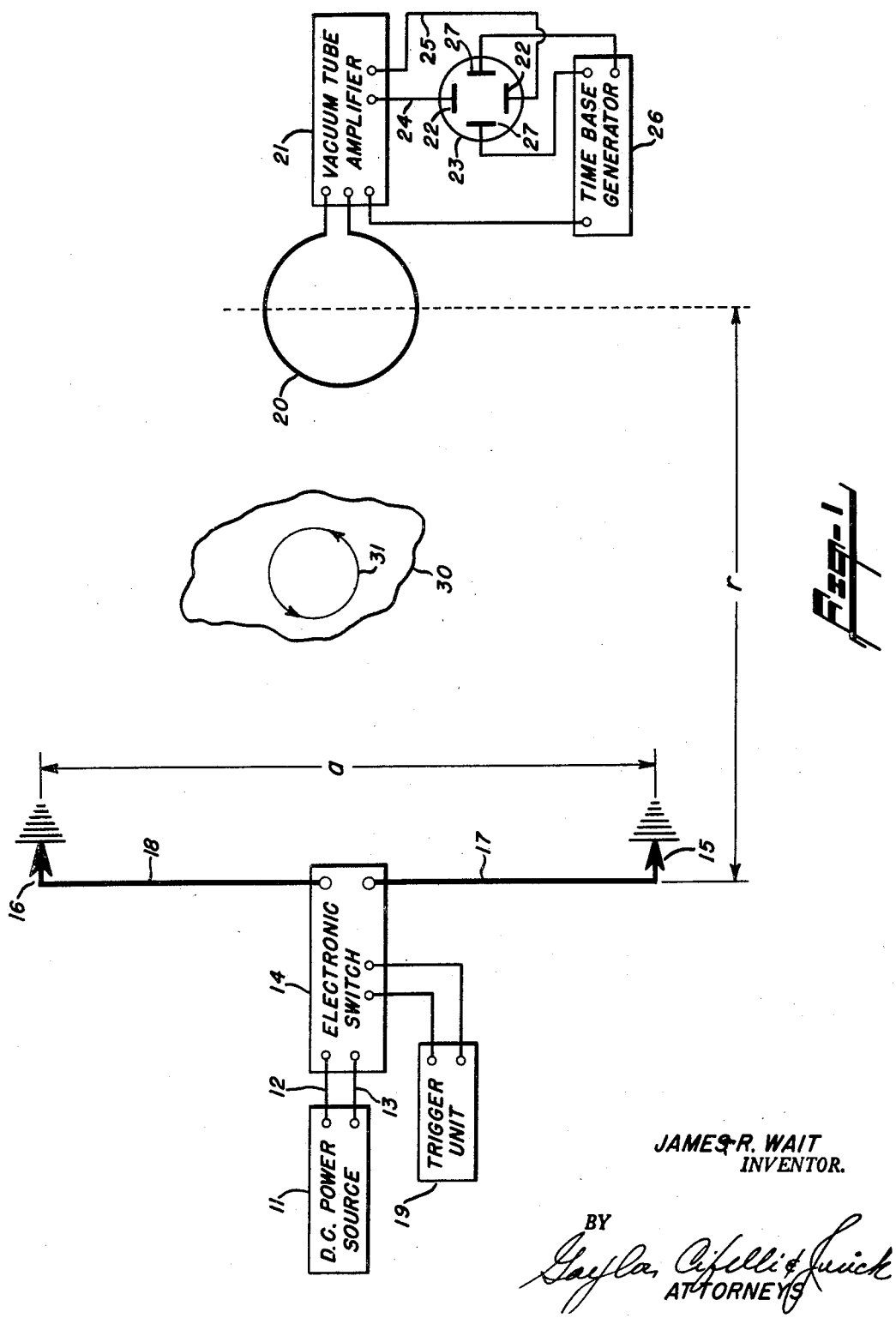

United States Patent Office 2,735,980
Patented Feb. 21, 1956

2,735,980

METHOD OF GEOPHYSICAL EXPLORATION

James R. Wait, Westboro, Ottawa, Canada, assignor to Newmont Mining Corporation, New York, N. Y., a corporation of Delaware Application December 23, 1953, Serial No. 400,064

8 Claims. (Cl. 324—7)

This invention relates to geophysical exploration and more particularly to a novel method for determining the presence and the approximate size of a sub-surface conducting ore zone such as, for example, a massive or interconnected sulphide body.

It is known that metallic minerals are usually found in nature in the form of sulphides and various methods are now in use by which the presence of such sub-surface ore bodies may be established. In addition to establishing the mere presence of mineralization within a given sub-surface region it is highly desirable to be able to determine the approximate size of the ore body so as to decide whether or not mining operations are warranted.

Prior electromagnetic methods of geophysical prospecting employ a single frequency oscillating magnetic field as a source. This primary magnetic field is generated by an insulated cable, or loop, lying on the surface of the earth and carrying the sinusoidal current.

The resultant magnetic field, due to the flow of the primary current in the cable and the currents induced in the conducting ore body, is measured and the manner in which such field varies is used as a means for ascertaining the presence and depth of the disturbing ore body. In these prior methods, however, no direct indication to ascertain the size of the disturbing conducting ore body is available.

An object of this invention is the provision of a method for establishing the presence and approximate size of a sub-surface zone of ore bearing material.

An object of this invention is the provision of a method of establishing the presence of a sub-surface ore body which method comprises applying an exciting magnetic field of step function form to a selected region of the ground and measuring the resulting secondary magnetic field response at periods of time of the order of milliseconds following the application of the exciting field.

An object of this invention is the provision of a method of ascertaining the approximate size of a sub-surface ore body which method consists in measuring the rate of decay, with time, of a secondary magnetic field response following the application of an exciting magnetic field of step function form to a selected region of the ground.

An object of this invention is the provision of a method of geophysical exploration which method comprises impressing a pulse of D.-C. current in a conductor disposed in the region of ground being investigated, and measuring the resulting voltage induced in a spaced detector coil, said coil being coplanar with the said conductor and symmetrically disposed with respect to the right bisector of the said conductor.

An object of this invention is the provision of a method for determining the approximate size and form of a sub-surface conducting ore body by observing the change in mutual inductance between a transmitter cable carrying a current of step function form and a detector coil, said cable and coil being disposed on opposite sides of the ore body.

These and other objects and advantages will become apparent from the following description when taken with the accompanying drawings illustrating the practice of my invention and wherein:

Figure 1 is a diagrammatic representation, in plan, showing the arrangement of the apparatus used in the practice of my invention;

Figure 2 is a curve showing the wave form of the charging current;

Figure 3 is a curve showing the wave form of the resulting exciting magnetic field impressed through the ground;

Figure 4 is a curve of the normal voltage induced in the detector coil;

Figure 5 is a curve of the secondary voltage induced in the detector coil as a result of the presence of a sub-surface conducting ore body; and Figure 6 is a curve of the resultant voltage induced in the detector coil and represents the sum of the two voltage curves shown in Figures 4 and 5.

Reference is made to Figure 1 which is a diagrammatic representation, in plan, showing the arrangement for practicing my invention in the field. The D. C. Power Source 11 is capable of supplying 1000 watts, at an adjustable voltage, to a load that may vary from 10 to 10,000 ohms and is connected to an Electronic Switch 14 by means of the two insulated leads 12 and 13. The switch 14 connects the D.-C. source 11 to the two, straight insulated cables 17 and 18 which terminate in the grounded electrodes 15, 16, respectively, the latter being spaced apart a distance "$a$" which distance is rather large so that only the magnetic field generated by the current flow in the cables 17, 18 need here be considered. It may here be pointed out that the electrodes 15 and 16 serve only as a means for obtaining a return current flow, in this case through the ground. It will hence be apparent that a loop, or coil, of insulated cable may replace the grounded system illustrated in the drawing. A Trigger Unit 19 controls the operation of the switch 14 so that a D.-C. current having a steep, step function, wave front is suddenly applied to the cables 17, 18. It is preferable that this current shall rise to its maximum value within a tenth of a millisecond or less, such action being readily obtained by means of present electronic techniques employing hydrogen filled Thyratron tubes.

The trigger unit may be a multivibrator which generates square waves, the steep sides of the square waves successively triggering the electronic switch in an on-and-off manner. The time duration of the flat top of the square wave should be sufficient to keep the electronic switch closed until all electromagnetic effects due to the step of current have closed, that is, the electronic switch is closed for, say, $\frac{1}{10}$ to 1 second. The opening of the electronic switch gives rise to a rapid drop of current, i. e., a negative step of current, and the electromagnetic responses would be just the same as for the positive current step except of opposite phase.

Reference is made to Massachusetts Institute of Technology, Radiation Lab. Series volume 19, "Wave Forms," Chance et al., sections 5–12 et seq. for trigger circuits suitable for use in the practice of my invention, and volume 22, "Cathode Ray Tube Displays," Saller et al., sections 4–5 for an electronic switch. Since such apparatus is well known in the art it is believed unnecessary to give a detailed description thereof. It is pointed out, however, that the electronic switch should be capable of carrying current up to 10 amperes.

The receiver of the system comprises a detector coil 20, formed of any convenient number of turns of insulated wire, the center of the coil lying on the right bisector of the line joining the electrodes 15 and 16, and at a distance "$r$" therefrom. The detector coil 20 and the source cable system 17, 18 all lie on the surface of the earth and hence are coplanar. Any voltage induced in the detector coil is amplified by the Amplifier 21, which has a flat frequency response from 10 to 500,000 cycles per second, and is applied to the vertical plates 22 of a cathode ray tube 23 by the wires 24, 25. Further, the initial voltage impulse in the coil 20 is employed to trigger a Time Base Generator 26 which applies an increasing voltage to the horizontal plates 27 of the cathode ray tube.

The complete operation of the system will now be described. Operation of the Trigger Unit 19 causes the Electronic Switch 14 to close the circuit between the Power Source 11 and the load that comprises the cables 17, 18, the voltage of the source 11 having been adjusted with respect to the resistance of the load so as to produce a desired magnitude of current flow through the cables. Figure 2 illustrates the step function wave form of such charging current flowing through the cables. As a result of this current flow a primary (exciting) magnetic field is established across the sub-surface conducting ore zone 30 and the detector coil 20, such primary field having a wave form as shown in Figure 3. In most cases the form of this magnetic field corresponds closely to a step function having a time rise determined largely by the conductivity of the surrounding medium. Actually, the magnetic field will have a shape similar to that of the magnetic field of an electric dipole energized by a step function current and which dipole is considered to be embedded in an infinite conducting medium. Further, the time constant of the rise of the field is of the order of tens of microseconds for normal, barren rock materials when the transmission distance "$r$" is less than 500 feet.

The magnetic field at the receiving loop 20, due alone to the source current flowing in the cables 17, 18, gives rise to an impulse voltage generated in the loop. Such induced voltage is proportional to the time rate of change of the exciting magnetic field, has the form shown in Figure 4, and decays essentially to a zero value in a time period of the order of tens of microseconds. Since this voltage is due solely to the source current and is obtained in regions of no appreciable conducting ore, it is referred to as the normal voltage.

When there is present an ore body 30, of appreciable size and high conductivity, the exciting magnetic field shown in Figure 3 causes eddy or circulating currents 31 to flow in the ore body, see Figure 1. These currents flow in closed circuits within the body and persist for a time period of the order of tens of milliseconds for a conducting ore body whose diameter is of the order of hundreds of feet. The relatively large value of self-inductance within the ore body 30 causes these circulating currents to flow for a time period of milliseconds after the application of the exciting magnetic field. The secondary magnetic field created by these circulating currents induces a secondary voltage in the detector coil 20, said voltage being in phase with the normal voltage as shown in the curve of Figure 5. Since the normal voltage (Figure 4) and the secondary voltage (Figure 5) are co-existent and in phase, they are combined in the detector coil to produce a resultant voltage that is equal to the sum of the induced voltages, as shown in Figure 6.

For ore bodies whose conductivity is at least one hundred times the conductivity of the surrounding medium (as is actually the case in the field) the initial part of the resultant voltage curve, Figure 6, will be relatively impulsive. The slowly decaying portion of the curve, beyond the period of 50 microseconds and which is due solely to the ore body circulating currents, is readily distinguishable from the initial impulsive portion of the curve.

The inital voltage impulse in the detector coil is used to trigger the Time Base Generator 26 of the cathode ray tube. In this way the detected voltage can be displayed as a function of time conveniently on the cathode ray tube. It can be shown that the time constant of decay of the resultant voltage waveform is almost directly proportional to the product of the conductivity of the ore body and the square of the effective diameter of the ore body.

Thus;
$e_t = k\sigma d^2$ where:
$e_t$ = the time constant of decay in seconds,
$k$ = a variable constant,
$\sigma$ = the conductivity of the ore body in mhos per meter,
$d$ = the effective diameter of the ore body in meters.

Now, for massive sulphides $\sigma$ averages 10 mhos per meter and $k\sigma$ may, hence, be combined as a constant
$$\frac{1}{C^2}$$
Then,
$$d = C\sqrt{e_t}$$

The triggered voltage on the screen of the cathode ray tube will appear about at the point A, see Figure 6, that is, just after the triggering action of the voltage pulse. Knowing the time sweep of the oscilloscope the value of $e_t$ is the time, taken in seconds, for the amplitude of the voltage pulse at the point A to fall to one third of its value. This can be read directly as a portion of the sweep thereby giving $e_t$ in seconds. The diameter $d$ of the conducting ore body is, then, proportional to the square root of this time $e_t$. The value of C can, if desired, be established by a field test or by model experiment. Therefore, the time decay of the Figure 6 curve, on the oscilloscope, furnishes a direct measure of the approximate size of the sub-surface conducting ore zone on the basis of $e_t$.

Calculations on idealized shapes of conducting ore bodies, such as, spheres, discs, thin beds, indicates that the curve shape of the resultant voltage, as well as its decay time, gives definite information concerning the shape or form of the ore body.

It is preferred that the sub-surface ore body be in the earth region between the cables 17, 18 and the detector coil 20 for best operation. It is not, however, necessary that the ore body be directly in line with such transmitter and receiver. Relative changes of the location of the transmitter and receiver coil and the ore body will vary only the relative magnitude and not the shape of the detected voltage signals.

Since variations of the detected voltage, with time, resulting from the step function, primary current are analagous, by La Place's transformation, to variations of the detected voltage with frequency of the primary current, the above described method is applicable in a system wherein a series of primary current frequencies are used and the detected resultant voltage is referred to or plotted against the reciprocal frequency of the primary current. The exciting magnetic field will again take the form shown in Figure 3, the normal detected voltage will be as shown in Figure 4, and Figure 5 again represents the detected secondary voltage that is due to circulating currents in the ore body. The resultant voltage will, of course, be the same as shown in Figure 6. In either case, the effect of the presence of the ore body at some point between the transmitter cables 17, 18 and the receiver coil 20 is, in all respects, that of increasing the mutual inductance between the cables and the coil.

It has been noted that a primary coil, or loop, may be employed in place of the straight lengths of the cables 17, 18 shown in Figure 1. A step pulse of current through such coil will produce an exciting magnetic field such as is shown in Figure 3 and the following sequence of steps will be parallel to those described.

Similarly, a series of current frequencies in the primary coil will bring about parallel results to a series of frequencies in the two lengths of the cables 17, 18. The results will be parallel to those shown in Figures 3–6 when amplitude is plotted against the reciprocal of frequency.

Still further, since the positioning of the detector coil 20 relative to the transmitter cables 17, 18 is unimportant in determining the relatively-long eddy current die-away time, in the massive sulphide body, it is apparent that the cables 17, 18 may be replaced by a primary coil at the mouth of or in a drill hole. The detector coil can be replaced by a long, narrow loop readily movable within the drill hole. Thus, investigations can readily be made along or within a drill hole, it being quite evident that in the latter case the transmitter and detector coils will lie in a plane corresponding to that of the drill hole rather than in the plane of the ground surface as shown in Figure 1.

The use of a step function, or square wave, of current, maintained at its constant maximum value until all electro-magnetically induced eddy currents in the subsurface ore bodies have died out, eliminates a return pulse through the earth. These eddy currents die out within 100 milliseconds, so the constant maximum value of the current step must be maintained for at least such period of time. All of the primary electromagnetic effects arising are generated while the step of current is rising, that is, only while the current in the grounded electrodes, or primary insulated loop, is changing. The resulting electromagnetic effects are a sharp micro-second voltage impulse in the pick-up coil due to the primary or normal flux which triggers the recording device and eddy currents generated in massive conducting sulphides by the primary flux. These eddy currents decay slowly, having a time constant of the order of 1 to 10 milliseconds in a sulphide body of some 100 foot diameter. Such eddy currents produce a secondary electromagnetic flux field at the pick-up coil which field also decays slowly. It is the voltage induced in the pick-up coil by the secondary flux field which is measured.

When the charging current pulse is switched off, the current in the transmitter cables falls sharply to zero thereby resulting in a negative step of current. The same electromagnetic phenomena takes place but 180 degrees out of phase with those arising from the positive current step. The display on the oscilloscope screen is just the same but now the wave trace is below the horizontal line rather than above.

Although the exciting current applied to the transmitter cables is a square wave the resulting primary magnetic flux field will not be a precise square wave by reason of the time constant introduced by the surrounding medium. Consequently, in the claims it will be understood that the term square wave as applied to the wave form of the primary flux field is intended to cover the wave form of the flux resulting from a square wave current flow in the transmitter cables.

Having now described my invention in detail in accordance with the patent statutes what I desire to protect by Letters Patent of the United States is set forth in the following claims.

I claim:

1. The method of detecting the presence of a subsurface conducting body by applying to a selected region of ground a primary magnetic field of square wave form and having a time duration of 100 or more milliseconds, and measuring the resultant magnetic field response after a period of 50–100 microseconds following the initial application of the said primary field.

2. The method of detecting the presence of a subsurface conducting body which method comprises placing a closed primary loop at the region of ground to be investigated, passing a square wave pulse of current through the loop said pulse having a time duration of 100 or more milliseconds, and measuring the decrease with time of the secondary magnetic field response after a period of time of 50–100 microseconds following the initial application of said current pulse.

3. The method of detecting the presence of a subsurface conducting ore body which method comprises the application of a square wave pulse of current of at least 100 milliseconds duration through a current-conducting loop disposed in the region of ground being investigated and measuring the resultant voltage induced in a pick-up coil 50–100 microseconds following the application of said pulse of current, the magnitude and decrease with time of said resultant voltage being taken as indicative of the presence of a conducting ore body in the vicinity.

4. The method of establishing the approximate size of a subsurface conducting ore body which method comprises applying a square wave impulse of current of at least 100 milliseconds duration through a current-conducting loop disposed in the vicinity of the ore body, and measuring the resultant voltage induced in a pick-up coil also disposed in the vicinity of the ore body, said measurement of the resultant voltage being made 50–100 microseconds after the application of the said pulse of current and the decrease of said resultant voltage with time being indicative of the approximate size of the ore body.

5. The invention as recited in claim 4, wherein the said current-conducting loop comprises a linearly-extending cable grounded at the ends.

6. The method of determining the presence and approximate size of a subsurface conducting ore body which method comprises placing a closed, current-conducting primary loop in the region of ground to be investigated, placing a pick-up coil at a point spaced from the primary loop and co-planar therewith, passing a square wave pulse of current of at least 100 milliseconds duration through the primary loop, and measuring the variation of the resultant voltage induced in the pick-up coil after a period of time of 50–100 milliseconds following the application of said pulse of current, the persistence of said resultant voltage in the pick-up coil after 1–10 microseconds being indicative of the presence of a conducting ore body, and the longer the persistence of such resultant voltage the greater the size of the ore body.

7. The invention as recited in claim 6, wherein the said primary loop comprises a straight cable extending along the ground and terminating in grounded ends, and the pick-up coil is disposed in the ground plane and within the lateral limits of the cable.

8. Apparatus for use in geophysical exploration comprising a current-conducting loop adapted to be disposed in the region of ground to be explored, a source of direct current, means applying current from the said source through the said loop in the form of square wave pulses having a duration of at least 100 milliseconds, a pick-up coil adapted to be disposed on the ground and spacially separated from the said loop, a cathode ray oscilloscope, an amplifier having its input terminals connected to the pick-up coil and its output terminals connected to the vertical plates of the oscilloscope, a time-base generator having its input triggered by the resultant voltage induced in the pick-up coil as a result of the steep front of the current pulses applied to the primary loop, and means connected between the output circuit of the said generator and the horizontal plates of the oscilloscope to delay the application of a voltage to the horizontal plates for a period of 50 microseconds.

References Cited in the file of this patent

UNITED STATES PATENTS

| | | |
|---|---|---|
| 1,748,659 | Sundberg | Feb. 25, 1930 |
| 2,104,440 | Stratham | Jan. 4, 1938 |
| 2,239,466 | Neufeld | Apr. 22, 1941 |
| 2,278,506 | Zuschlag | Apr. 7, 1942 |
| 2,527,559 | Lindblad et al. | Oct. 31, 1950 |
| 2,644,130 | Summers | June 30, 1953 |
| 2,685,058 | Yost | July 27, 1954 |